United States Patent [19]

Lindberg

[11] 4,417,548
[45] Nov. 29, 1983

[54] COMBUSTION CONTROL SYSTEM AND IMPROVED ELEMENTS THEREFOR

[75] Inventor: John E. Lindberg, Point Richmond, Calif.

[73] Assignee: U.S.A. 161 Developments Ltd., Berkeley, Calif.

[21] Appl. No.: 348,867

[22] Filed: Feb. 16, 1982

[51] Int. Cl.³ .................. F02M 25/02; F02M 25/06
[52] U.S. Cl. ........................ 123/25 E; 123/25 B; 123/568; 123/573; 123/590
[58] Field of Search .............. 123/25 B, 25 E, 25 P, 123/25 D, 568, 572, 573, 590

[56] References Cited

U.S. PATENT DOCUMENTS

| | | | |
|---|---|---|---|
| 1,484,000 | 2/1924 | Wight | 123/25 B |
| 1,619,830 | 3/1927 | Ross | 123/25 B |
| 1,630,242 | 5/1927 | Ross | 123/25 B |
| 1,677,609 | 7/1928 | Abel | 123/25 B |
| 1,981,891 | 11/1934 | Woermann | 123/25 B |
| 4,112,892 | 9/1978 | Lindberg | 123/25 E |
| 4,183,338 | 1/1980 | Lindberg | 123/25 E |
| 4,270,508 | 6/1981 | Lindberg | 123/568 |

*Primary Examiner*—Ira S. Lazarus
*Attorney, Agent, or Firm*—Owen, Wickersham & Erickson

[57] ABSTRACT

A combustion control system for an engine having an intake manifold with a throttle, a PCV gas inlet opening into the intake manifold, an exhaust conduit, and a PCV gas conduit. A vortex device has a vortex chamber with a tangential inlet connected to the PCV gas conduit, an axial inlet, and an axial outlet connected directly to the PCV gas inlet opening of the intake manifold. A reactor device has a gas inlet connected directly to the exhaust conduit for drawing gas therefrom and an outlet spaced well apart from the vortex device and connected to the axial inlet of the vortex device by a conduit. The reactor device includes a first ejector for drawing in atmospheric air and mixing it with gas from the exhaust conduit, and a second ejector for drawing in liquid from a source of liquid and sending it into the atmospheric air drawn in by the first ejector means. The vortex device and the reactor are novel in themselves too.

36 Claims, 20 Drawing Figures

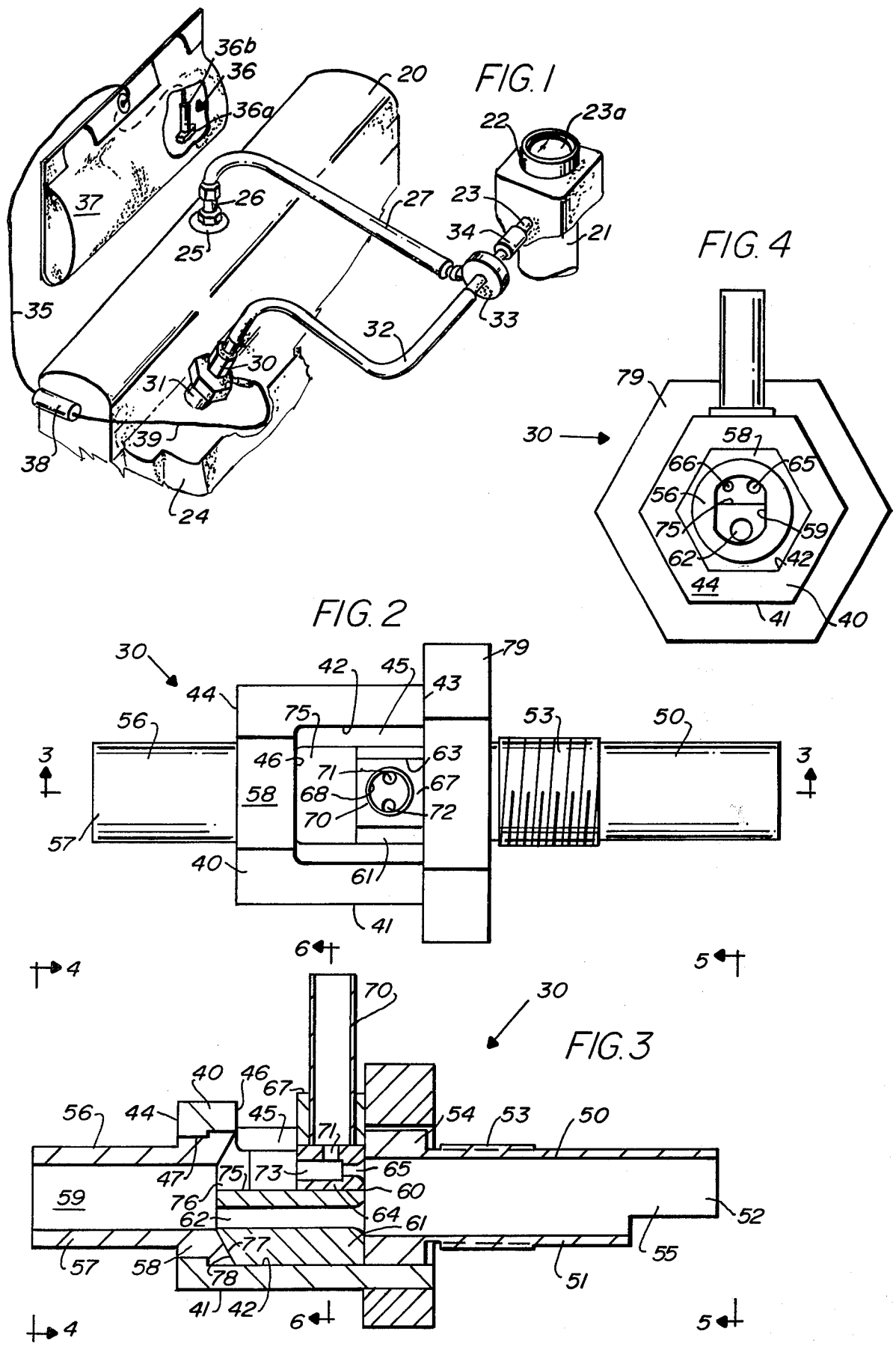

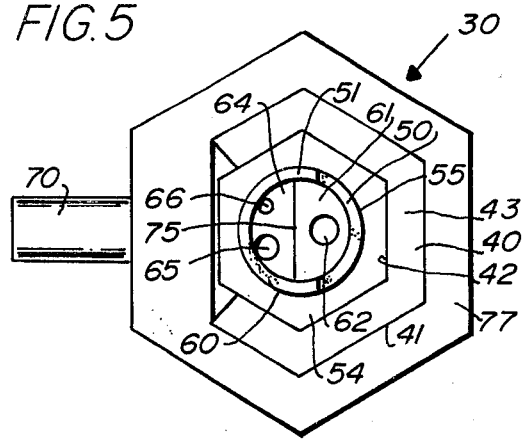
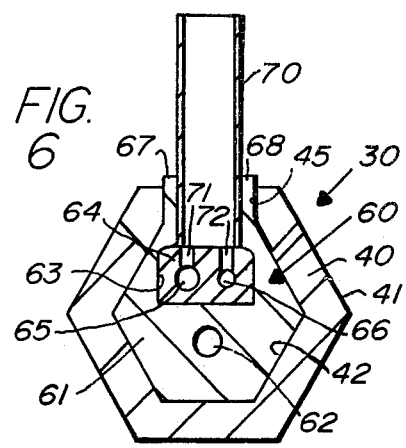
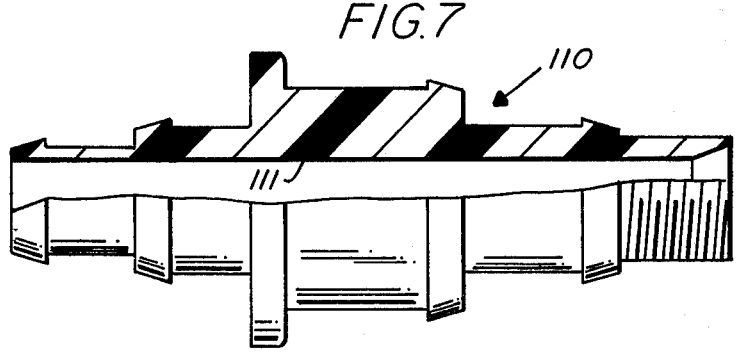
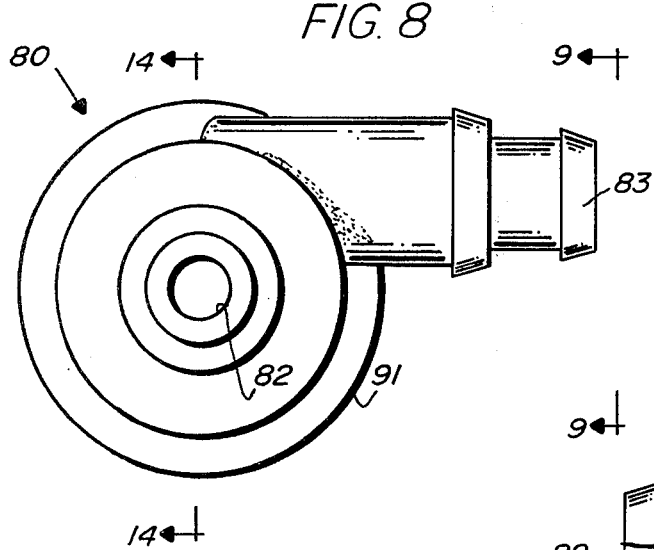
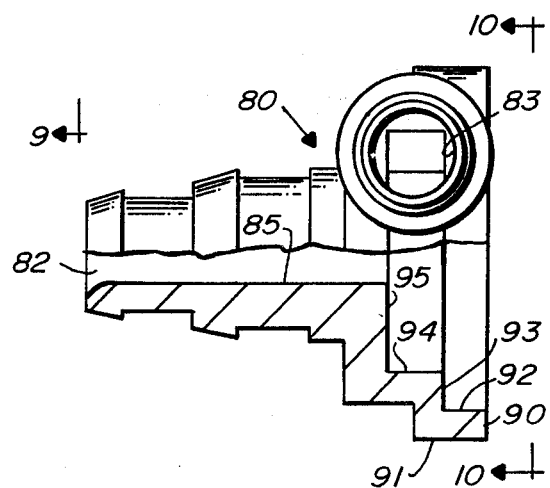

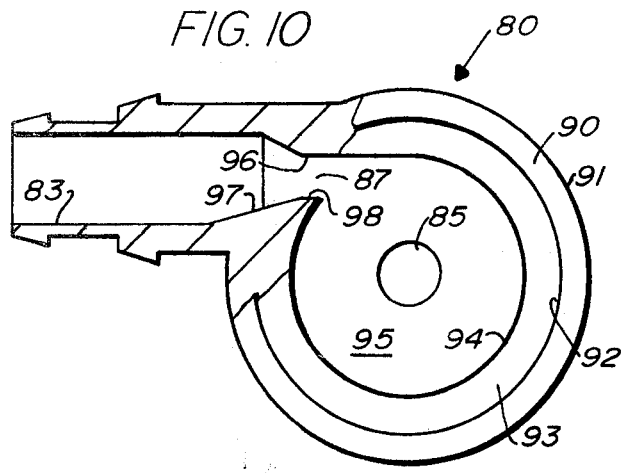
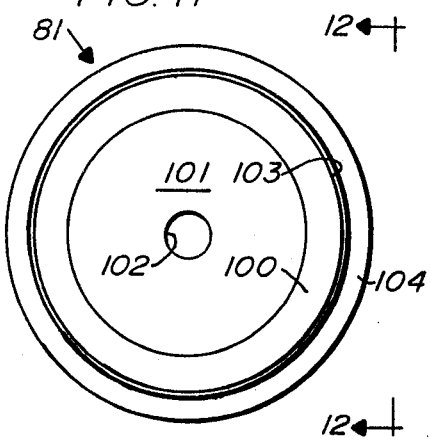
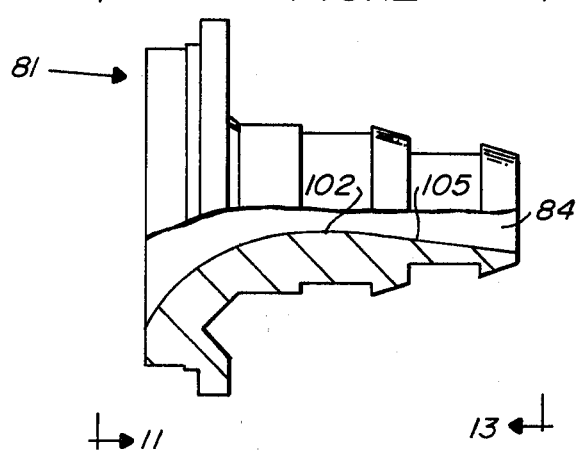
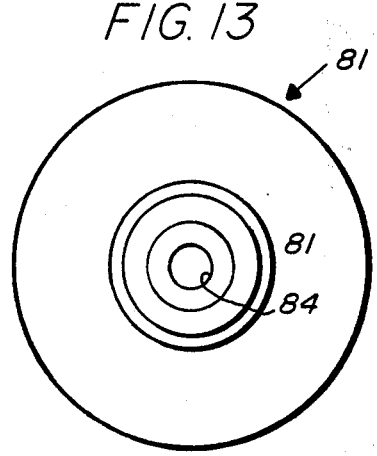

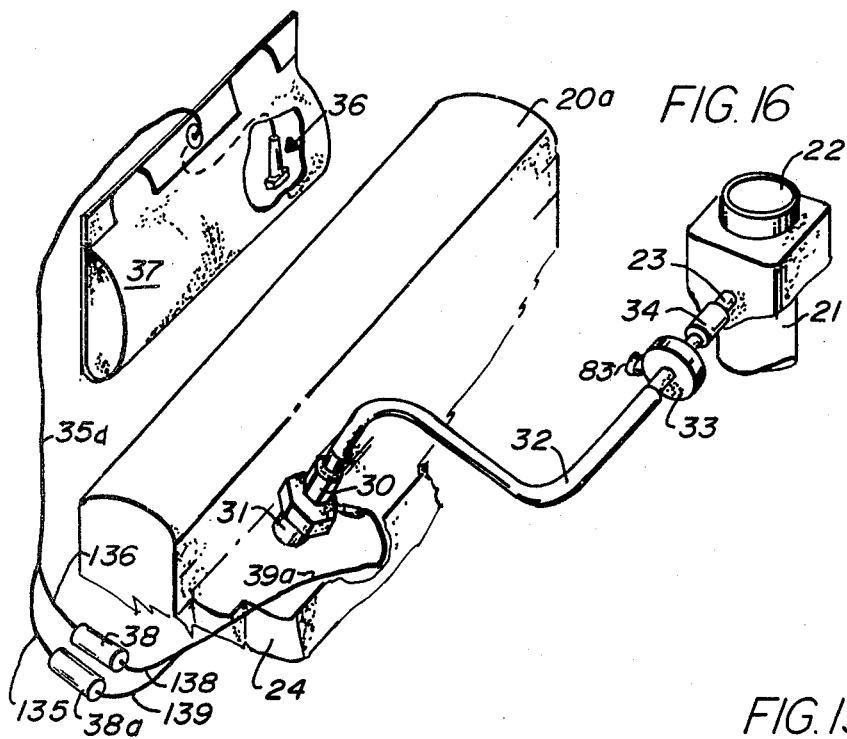
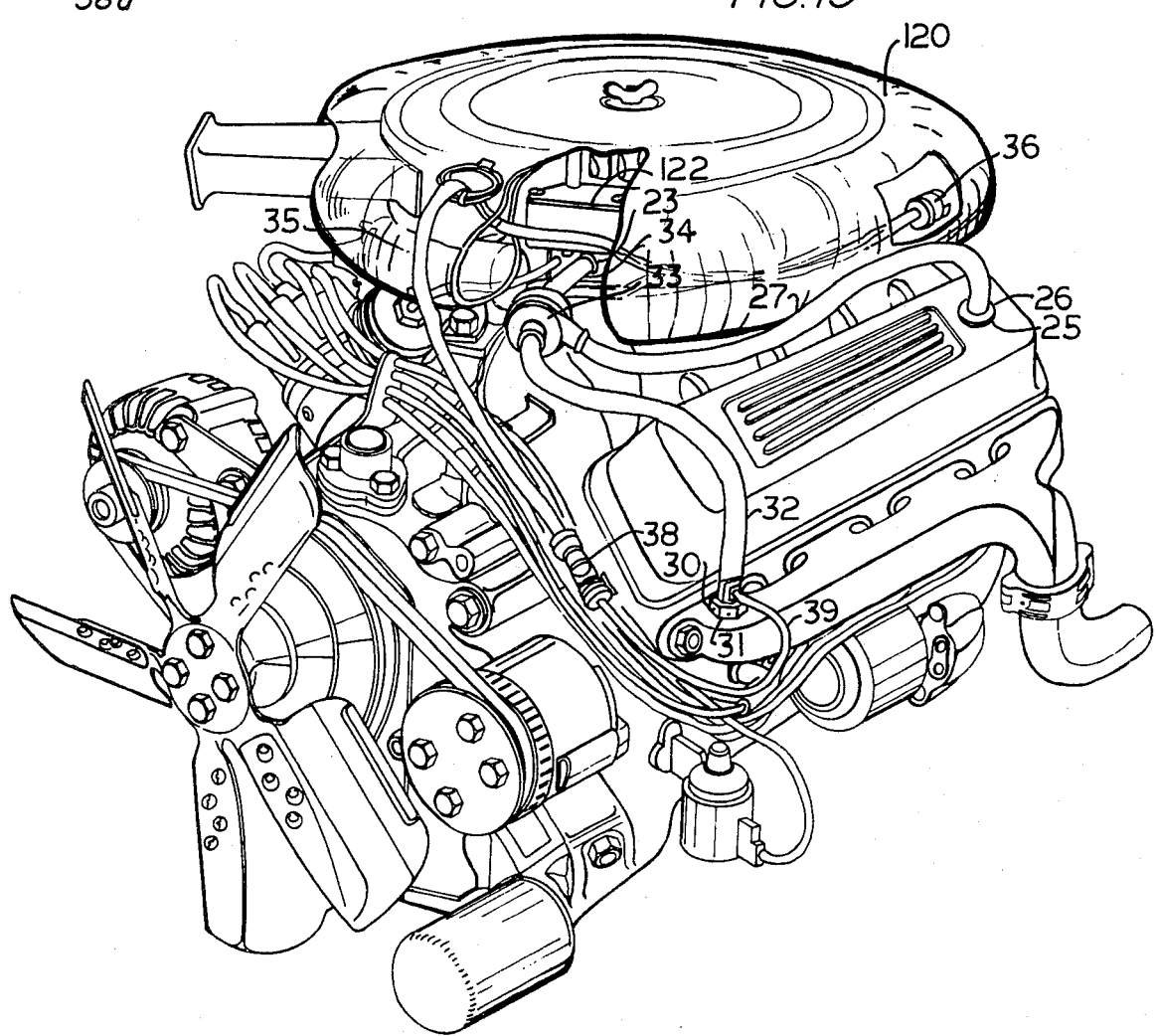

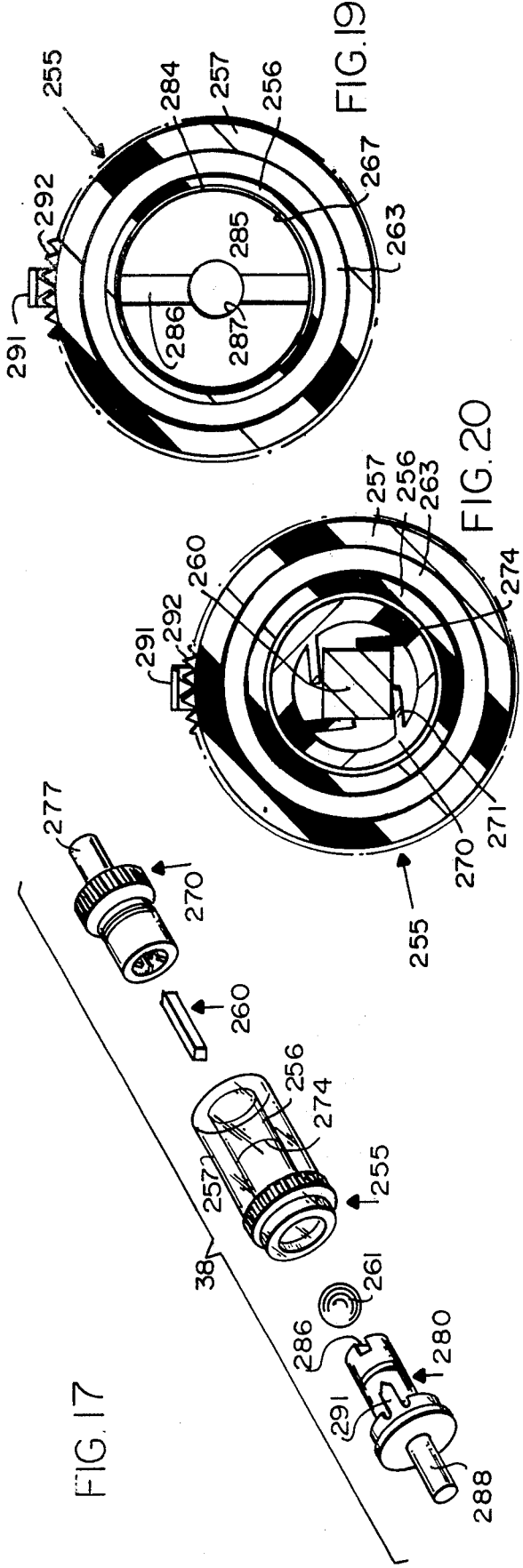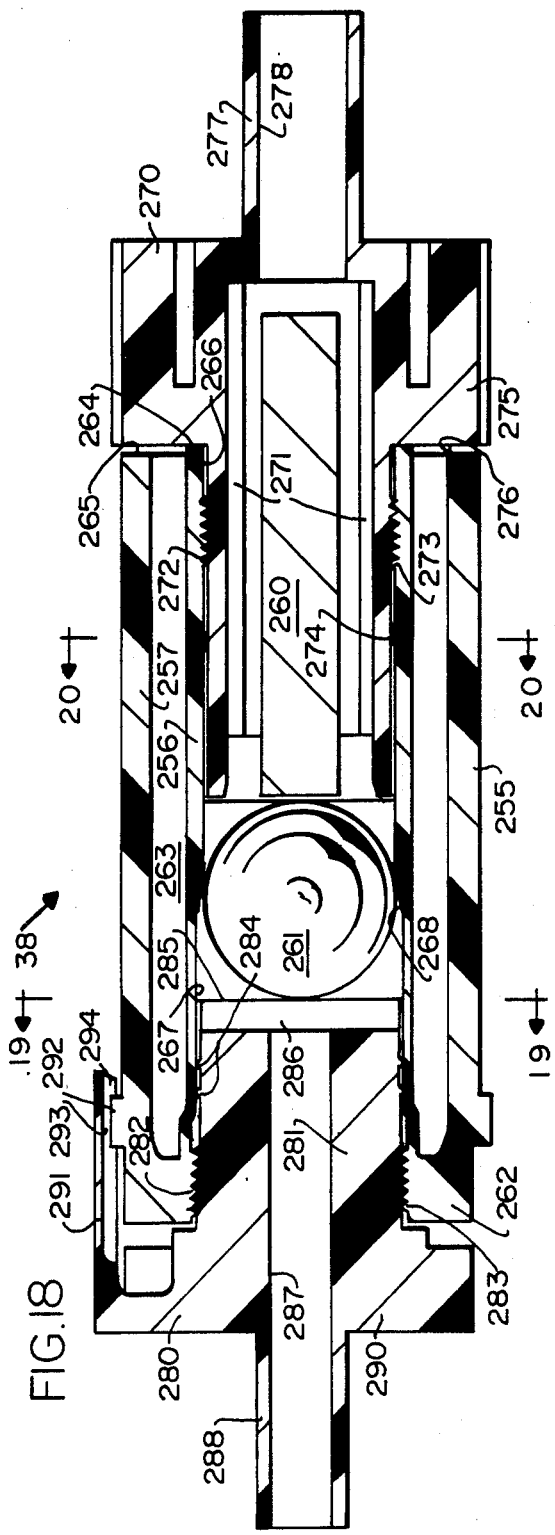

COMBUSTION CONTROL SYSTEM AND IMPROVED ELEMENTS THEREFOR

This invention relates to an improved combustion control system for internal combustion engines and the like and to an improved reactor and an improved control device therefor.

BACKGROUND OF THE INVENTION

This invention is an improvement over the invention described and claimed in my U.S. Pat. No. 4,270,508. It is also an improvement over my U.S. Pat. No. 4,183,338. In those two patents the invention provides a single device having a reactor portion wherein exhaust gas is mixed with a liquid such as water and with air in combination with a control portion comprising a vortex chamber wherein the reactor's product is mixed with PCV gas or with air and fed to the intake manifold of an internal combustion engine. These devices were both single units.

I have, since making those inventions, discovered that the single-unit concept produces certain disadvantages. Thus, in order to gain maximum efficiency, the single unit had to be put next to the intake manifold; as a result, it was remote from the engine exhaust manifold, and this remoteness reduced the efficiency of the reactor portion of the device. Another problem with the earlier devices referred to above was that as engine oils have been continually improved, it became more and more difficult to burn them up and thereby prevent grease deposits; hence the grease deposit problems became serious.

SUMMARY OF THE INVENTION

I have now discovered that improved results can be obtained by separating the two portions of the device and locating the reactor closely adjacent to the exhaust manifold, while the control device remains as a separate element adjacent to the intake manifold. Better functioning is thereby obtained, and the grease deposit problem is solved since the PCV gases are brought tangentially into a cool control device and are carried on into the intake manifold without grease formation. Other significant results follow too. For one thing, this separation enables the separate control device to be molded from plastic in two parts that are readily assembled together. At the same time, the reactor, which, due to the heat to which it is exposed, is preferably made from metal, can also become a simpler unit. Further, the conduit between the reactor and the control device can be of substantial length without substantially reducing the overall efficiency of the system, and this conduit can be made from silicone elastomer instead of having to be made of metal.

I have found that this simplification of each of these two apparatus results also in lower total cost of manufacture.

The invention thus comprises a combustion control system in which a reactor is located closely adjacent to one cylinder of the exhaust manifold to obtain maximum temperature and exhaust pressure and is connected by a flexible conduit to the control device, which is located closely adjacent to the intake manifold of the engine to provide maximum turbulence for best distribution.

The reactor cooperates with a device supplying to it a controlled amount of water supplied in accordance with the engine combustion need. The water supplying device provides a relationship between the amount of water supplied and the differential pressure between the water feed pressure supplied by the reactor and atmospheric pressure. The device supplies water beginning at a threshold differential pressure and increasing at a substantially linear rate up to a certain point, and then above that point is automatically decreased or supplied at a constant value or at a slower rate of increase. The reactor itself is an improved structure which, although employing basic elements similar to those shown in my patent 4,270,508 in achieving substantially the same type of result, gives improved performance and lower production cost as a result of somewhat different structure.

Thus, the reactor has an intake conduit with an inlet for direct connection to the engine exhaust and an outlet axially in line with the intake conduit for connection to the engine intake manifold through the control device. In between the inlet and the outlet is an ejector assembly comprising a first ejector directly interposed between the intake and outlet conduits and a second ejector leading from the intake conduit across an open air-intake space to an air-intake opening just beyond the first ejector. The second ejector has liquid intake means perpendicular to the second ejector and leading thereinto ahead of the open air-intake space. This second ejector may comprise a pair of parallel ejector passages, one having about twice the cross-sectional area of the second ejector. Further, the intake conduit comprises a scoop shaped portion projecting into the exhaust gas stream.

To complete what may be called the reactor system, there is a source of water or aqueous material or other suitable liquid, such as a liquid-holding reservoir. In the bottom of such a reservoir near the rear end there may be an intake filter which is connected through the liquid control device to the reactor by conduits. The liquid control valve acts as a check valve below the threshold differential pressure and also provides flow control determining the actual amount of water that is sucked into it and delivered to the reactor for each differential pressure value above the threshold value. There may also be a "top end" control here, so that above a certain pressure differential the amount of water delivered decreases with increasing differential or remains constant thereafter or increases at a lower rate of increase, depending on what is desired at the engine. The water-supplying valve is described and claimed in my co-pending patent application Ser. No. 348,700 filed Feb. 16, 1982 which is incorporated herein by reference.

The reactor device preferably comprises an assembly of metal parts. It has a body with a hexagonal prism exterior and a hexagonal prism interior, which, between its ends, has one wall cut away to provide the air-intake space. The intake conduit may be a cylindrical tube with an inlet at one end and exterior threads to screw into a threaded opening such as may be tapped into the exhaust manifold. The intake conduit has a hexagonal head fitting snugly inside the other end of the body. A tubular member with a hexagonal outer wall fits snugly inside the other end of the body. A cylindrical tubular portion comprising the outlet conduit projects beyond the body.

An ejector assembly fits snugly inside the body between the outlet conduit and the intake conduit. This assembly has a first ejector member with an ejector opening therethrough and a second ejector member with one or two smaller ejector openings therethrough. The ejector assembly has a portion projecting out through the air-intake space, this portion being provided with a passage leading perpendicularly into each second ejector opening. A cylindrical fitting extends into the second ejector member and leads out from each passage. The first ejector member provides separation between the first and second ejectors, between their outlets and the passage means that leads from the air-intake space into the outlet conduit.

A hexagonal ring may be swaged to the body for holding the body to the hexagonal head of the inlet conduit.

The system of this invention also includes a control device which is located adjacent to the intake manifold and therefore is separated by a substantial distance from the reactor. I have found that this separation causes the heat to be sufficiently dissipated at the reactor so that the reactor and control device can be connected together by tubing of silicone elastomer. The control device is also connected to a PCV valve or to an inexpensive replacement for that valve, giving even better results; the connection can be made by normal PCV tubing. This separation enables the control device to be simpler than heretofore and to be manufactured as a molded plastic assembly. Being located closely adjacent to the intake manifold, it supplies its mixture to the intake manifold at high turbulence, a very desirable thing to do.

The control device itself may comprise two molded plastic members secured together.

A first member is shaped to provide a circular annular rim with cylindrical external and interior walls. The interior wall leads to a substantially annular shelf from which a substantially cylindrical interior wall leads to a flat substantially annular interior end wall. This first member also has a central axial inlet portion with round exterior walls and an inlet passage opening into the center of the end wall. The first member further has a tangential inlet portion with circular exterior walls and a straight passage leading through the shelf and the substantially cylindrical wall and onto the end wall.

A second member has a circular annular end wall with a frustoconical interior wall leading to a central opening. A circular cylindrical exterior wall around the end wall leads to an annular rim therearound. This member has a round outlet portion wherein the central opening leads to a flared outlet passage.

The first and second members fit together and are sealed together, as by ultrasonic welding, the annular end wall of the second member engaging the shelf of the first member and a cylindrical exterior wall nests snugly in, and is secured to, the interior wall of the first member. The rim of the second member faces the rim of the first member but need not abut it.

BRIEF DESCRIPTION OF THE DRAWINGS

FIG. 1 is an isometric simplified view of a combustion control system embodying the principles of the invention and showing its connection with an engine, there being some simplification of the engine parts.

FIG. 2 is a view in elevation of a reactor embodying the principles of the invention.

FIG. 3 is a view in section taken along the line 3—3 in FIG. 2.

FIG. 4 is an end view looking along the line 4—4 in FIG. 3.

FIG. 5 is an end view looking along the line 5—5 in FIG. 3.

FIG. 6 is a view in section taken along the line 6—6 in FIG. 3.

FIG. 7 is a side view with the upper portion in longitudinal section, of a member which may be substituted for an existing PCV valve.

FIG. 8 is an inlet-end view of the inlet half of the improved control device of the invention, which is an assembly of two separate elements.

FIG. 9 is a view in side elevation looking along the line 9—9 of FIG. 8, with the lower half broken away and shown in section.

FIG. 10 is an end view looking along the line 10—10 in FIG. 9, with the tangential inlet broken away and shown in section.

FIG. 11 is an end view like that of FIG. 10 of the other, outlet, element of the control device, looking along the line 11—11 in FIG. 12.

FIG. 12 is a side view of the outlet element of FIG. 11, looking along the line 12—12 in FIG. 11, with the lower half shown in section.

FIG. 13 is an end view of the outlet end of the outlet element of FIG. 11, looking along the line 13—13 of FIG. 12.

FIG. 14 is an assembly view in longitudinal section of the two elements of FIGS. 8-10 and 11-13 put together.

FIG. 15 is a perspective view of a V-8 engine with a system of the present invention installed therewith. A portion of the water reservoir is broken away.

FIG. 16 is a view similar to FIG. 1 of a diesel engine.

FIG. 17 is an exploded isometric view of one form of valve employed in the invention.

FIG. 18 is an enlarged longitudinal section of the assembled valve of FIG. 17.

FIG. 19 is a view in section taken along the line 19—19 in FIG. 18.

FIG. 20 is a view in section taken along the line 20—20 in FIG. 18.

DESCRIPTION OF A PREFERRED EMBODIMENT

The complete system (FIG. 1)

FIG. 1 shows in simplified form a system embodying the principles of the invention in connection with an engine 20 having an intake manifold 21 with a carburetor 22 and a PCV gas inlet 23 leading into the intake manifold 21 below the butterfly valve 23a (or the like). The engine 20 also has an exhaust manifold 24 and an opening 25 into its valve cover, in which a PCV valve 26 is usually mounted, with a conduit 27 attached to it.

The present invention employs a reactor 30 closely adjacent to the exhaust manifold 24 and connected to it through a tapped opening 31. A tube 32 connects the reactor 30 to a control device 33 having a vortex chamber and located closely adjacent to the intake manifold 21, a conduit 34 leading in through the PCV gas inlet 23. Another tube 35 may lead from a water intake filter 36 that is inside a water reservoir 37 which is mounted lengthwise of the vehicle having the engine 20. The conduit 35 leads to a water intake control valve 38, whence a conduit 39 leads to the reactor 30. The flexible conduit 27 connects the PCV valve 26 (or a substitute member shown in FIG. 7) to the control device 33.

The result of this system is to improve combustion, basically in the same manner as is done in U.S. Pat. Nos. 4,183,338 and 4,270,508, and it does so in a more efficient manner and with parts that are less expensive to manufacture.

The reactor 30 (FIGS. 2-6)

The reactor 30 is preferably an assembly of metal parts, some of which are preferably made from powdered metal, as by pressing, followed by sintering.

A body 40 has a hexagonal-prism exterior wall 41 and a prismatic interior wall 42, also hexagonal in cross-section, extending straight between end walls 43 and 44. One of the hexagonal walls is cut away from the body, at and from the end wall 43 up nearly to the end wall 44, to provide an air-intake space 45 and leaving an interior wall 46 next to the end wall 44. Between the walls 46 and 44 is a stepped hexagonal opening 47.

An intake conduit member 50 comprises a cylindrical tube 51 with an inlet 52 at one end and with exterior threads 53 enabling it to be threaded into the opening 31. The tube 51 has a hexagonal head 54 at its other end. At the inlet 52 a scoop 55 is provided by cutting off a cylindrical segment of the tube 51, preferably leaving at least half and preferably a little more of the cylindrical wall.

An outlet conduit 56 comprises a tubular member with an exteriorly oval, nearly cylindrical portion 57 and a stepped hexagonal head 58 fitting snugly inside said body 40 in the passage 47 between the walls 44 and 46. Its nearly cylindrical shape, preferably not circular, provides for keying so that it can be held during assembly of the parts. The nearly cylindrical tubular portion 57 projects beyond the body 40 and receives one end of the conduit 32. Its interior passage 59 is also not circular, having arcuate ends and flat sides.

An ejector assembly 60 includes a first ejector member 61 which is generally a hexagonal prism as seen in cross-section and fits snugly inside the body 40 between the outlet conduit 56 and the intake conduit 50. The first ejector member 61 has a shaped first ejector opening 62 therethrough and a slot 63 that receives a second ejector member 64 having at least one or two other smaller ejector openings 65 and 66 therethrough. Preferably, the opening 65 (which may be the only opening) is much larger, i.e., about twice the diameter of the smaller opening 66 (if two openings are used), while the first ejector opening 62 is preferably at least twice the diameter of the opening 65, so that it is larger in cross-sectional area than the cross-sectional areas of both the openings 65 and 66 added together. A portion 67 (FIG. 6) of the first ejector member 61 projects out perpendicularly from the main portion through the air-intake space 45 and is provided with a passage 68 leading perpendicularly into the second ejector assembly 64.

A cylindrical fitting 70 is press-fitted into the passage 68 and extends into smaller passages 71 and 72 leading into the ejector openings 65 and 66, respectively, at wider outlet portions 73, so that the conduit 39 can be attached to this fitting 70.

The first ejector member 61 provides a wall 75 separating between the first ejector opening 62 and the second ejector openings 65 and 66, in the space 45. This wall 75 is also shaped to provide an inlet passage 76 (FIG. 3) leading from the air-intake space 45 into the interior 59 of the outlet conduit 56. The outlet conduit 56 has a frustoconical end wall 77 where it joins the first ejector member 61, which has a matching frustoconical end wall 78. The size of the orifice 76 is affected by the height of the flat wall 75 and then by the spacing apart of the two flat portions of the passage 59.

A hexagonal ring 79 (FIGS. 2 and 4) is swaged to the body 40 and holds the body 40 to the hexagonal head 54 of the inlet conduit 50.

The scoop 55 is preferably located as close as possible to the exhaust valve, directly in the flow path of the exhaust from one cylinder of the exhaust manifold 24 so as to assure pickup of total pressure of the exhaust gas. The system takes advantage of surges in pressure resulting from the exhaust cycle of its associated cylinder, picking up the total pressure, i.e., the static head plus the velocity head pressure. This exhaust gas is then conducted through the inlet conduit 50 and into the reactor 30 to the ejector openings 62, 65, and 66. Since the first opening 62 has a much larger diameter than do either of the second ejector openings 65 and 66, most of the flow will be through that ejector 62 with a smaller amount going through the second ejector openings 65 and 66. If desired, either of the second ejector openings 65 or 66 may be plugged for use of the device on smaller engines, but sometimes it is desirable to employ both of these ejector openings 65 and 66. By having them both, a type of oscillation results which is quite desirable, as first one opening 65 and then the other opening 66 is temporarily plugged with water while the other one is open, the action alternating in such a manner as to assure a better and more consistent supply of the liquid. The water inlet tube 35, being connected to the second ejectors 65 and 66 by the passages 71 and 72, water or other suitable liquid is drawn in through the passages 71 and 72 as a result of the passage of the exhaust gas through the two ejectors 65 and 66, taking in the water, or other suitable liquid, mixing it with some of the exhaust gas, and then sending it across the air-intake space.

Meanwhile, the passage of hot exhaust gas through the first ejector 62 draws in air from the air-intake space 45 via the passageway 76, thereby at the same time drawing in the moisture droplets from the ejectors 65 and 66. The output of all three ejectors 62, 65 and 66 forms a reacting mixture which then flows into the outlet tube interior 59 and then by the tube 32 to the control device 33.

The liquid supply system (FIGS. 1 and 15)

In my U.S. Pat. No. 4,270,508 issued June 2, 1981, the total pressure in the exhaust system of an internal combustion engine is employed, among other things, to create suction to draw in water from a water reservoir at a rate depending on the exhaust manifold static or total pressure near one cylinder to aid in obtaining better combustion of the fuel in the engine. The conduit leading from the water reservoir may be several inches long, often several feet long, and may extend well above the water reservoir. It is highly desirable in such an instance to maintain water in that conduit, so that water is drawn from it as soon as the device control pressure increases above a certain threshold value. Otherwise, the lapse of time before water would be provided to the engine combustion system would result in delayed response while extra dry air would be sucked in, giving quite different combustion performance.

The present invention, as applied to this combustion control system, may be used with an intake near the lowest end of the conduit, inside the water reservoir and at the bottom of that reservoir and a valve outside the reservoir. It enables the flow of water from the reservoir (or other source of water) into the combustion system, and in its check-valve function it assures that water is always retained in the conduit leading from the reservoir, including the times when the engine is not running and when the intake manifold pressure is above a threshold level, so that the water is available for immediate supply to the induction system of the engine when the engine demands it.

In the system as previously described and patented, the fluid control valve was located in the water reservoir. This location caused a problem that was noted in several tests, both on the road and in the laboratory, in an improved form of valve. The problem was that when a car was left to cool overnight, no flow of water could be measured through the system on the following morning. The improved valve, described and claimed in co-pending application, Ser. No. 348,700, filed Feb. 16, 1982 employed a steel ball seating at times against a frustoconical plastic seat and pulled there by a magnet. Apparently the ball in the valve had become stuck, and the sticking seemed to be due to the temperature cycle of the water in the reservoir. The reservoir, being under the hood of the automobile, its contained water became heated as the car was driven. Since the valve was located in the reservoir and was immersed in the water, it also was heated to the temperature of the water as the car was driven. Also, it was known that the coefficient of expansion of the plastic of which the valve body was molded (polypropylene) is greater (approximately 10X) than the coefficient of expansion of the 440 stainless steel ball in the valve. Thus, it appears that when the automobile engine was turned off, the ball was pulled closer to the magnet than normally, because the frustoconical seat in the plastic body had expanded more than the ball. Moreover, the plastic seat was apparently slightly softened by the heat, so that the ball, under the pull of the magnet, pressed into the seat and approached the magnet more closely than would have been possible if the seat were cold and "firm." Finally, during gradual cooling over the following several hours, the ball was held in place by the magnet with unusual force, because the ball was in closer proximity with the magnet than it had originally been adjusted for. At the same time, the body apparently contracted more than the ball, and shrunk around the ball, capturing it, and causing the whole assembly to become stuck. Therefore, to become unstuck, the assembly had to be heated, because the body had to expand more than the ball in order to be freed.

As a result of these experiments, a new form of valve was devised, as shown in FIGS. 19-22 in the referred-to co-pending application, which are the same as FIGS. 17-20 in the present case.

The location of the valve was changed. Thus, the valve 38 is not put into the reservoir 37, because of the relatively high heat encountered there, the slow rate of heat rise there, and because the valve is there insulated from shock and vibration. The weighted filter 36 may be used in the reservoir 37 to pick up water at the bottom. The 3/16" rubber tube 35 takes water to the valve 28 where its flow is regulated. The ⅛" rubber tube 39 takes water from the valve 38 to the reactor tube 70.

FIGS. 17 to 20 show a valve 38 which has a body 255 with two coaxial cylindrical tubes 256 and 257. The interior tube 256, in conjunction with a magnet 260 and ball 261, performs the check valve and fluid flow rate control functions. The outer tube or sleeve 257 acts as a thermal insulator to the functional inner cylinder 256 during operation. This moderates short-term temperature fluctuations that might cause inopportune sticking of the ball 261. Also, the sleeve 257 helps to enable the valve 38 to be mounted in a variety of locations. This is important, because when the valve was suspended in the reservoir, the body was not subjected to physical distortions. When the valve 38 is attached to some rigid structure outside the reservoir, the sleeve 257 absorbs distortions introduced by the installation. The valve 38 is properly supported by securing its inlet or outlet hose 251 and 252 to appropriate structure.

The tubes 256 and 257 are joined together by a radial portion 262 at the outlet end only. Otherwise, they are spaced apart radially by an annular space 263. The open end 264 of the inner tube 256 lies a little beyond the open end 265 of the outer tube 257. The inner tube 256 has a cylindrical inlet bore 266, a larger-diameter cylindrical outlet bore 267, and a frustoconical or tapered portion 268, acting as one seat for the ball 261.

The magnet 260 is in a holder 270 having four retaining fins 271, which, preferably, are slightly warped to enhance installation of the magnet 260. The holder 270 has threads 272 that go into the bore 266 and form matching threads 273 there. There is also a sealing rib 274. The holder 270 has a radially outwardly extending flange 275 with a radial wall 276 that abuts the open end 264 of the inner tube 256, and there is clearance between the wall 276 and the open end 265 of the outer tube 257 to prevent distortion of the inner tube 256. The holder 270 also has an inlet fitting 277 with a bore 278 therethrough.

The valve 38 has a seat member 280 having a cylindrical portion 281 with external threads 282 engaging threads 283 of the body 255 and sealing ribs 284. The cylindrical portion 281 ends in a planar annular end wall 285 into which are recessed radial passages 286 and from which a smooth bore 287 leads axially through the member 280, extending beyond the cylindrical portion 281 and into a smooth cylindrical or tubular portion 288.

A cylindrical flange 290 has an axial finger 291, and the body 255 has a knurled portion 292 on the exterior wall of the outer tube 257. A recessed portion 293 of the finger 291 has a rib 294 to engage the knurls 292 and give a click for each small turn of the member 280 relative to the body 255.

The ball 261 seats, as before, against the frustoconical passage portion 268 and can move against the end wall 285. The distance from the magnet 260 to the seated ball 261 is regulated by rotating the exteriorly threaded magnet holder 270 in the interiorly threaded tube 256, and the distance between the ball's two seats 268 and 285 may also be varied by rotating the seat member 280 in the threads 283 of the body 255, often while counting the clicks this produces.

During operation, water flows from the reservoir 37 or other fluid source through the rubber tubing 35 to the inlet fitting or stem 277 of the magnet holder 270. Water flows around the magnet 260. The relative position of the ball 260 and the molded seat 268 control fluid flow. The valve 38 is sealed until it is warm. When unstuck, flow is possible only when sufficient suction is applied to the outflow stem 288. The distance that the ball 261 is allowed to travel regulates flow, when flow occurs. The water flows out through the outflow stem 288.

The primary control of flow rate is due to balancing of magnetic and drag forces on the ball 261. In addition, there is "top-end" control by the member 280.

Any time when the ball 261 is off its seat 268 and the pressure differential is greater than a threshold value, fluid will flow through the valve 38. The rate of fluid flow is regulated by the variable resistance to flow caused by the ball 261 partially obstructing the flow.

In FIG. 15, a differently shaped reservoir 120 is shown; otherwise, the system is the same, so far as this invention is concerned.

Certain criteria guide the choice of the location where the valve 38 is to be installed. The valve 38 is kept away from large thermal masses; so, as shown best in FIG. 15, it is not installed directly above the engine 121 or on the radiator (not shown) or on the radiator hose. The valve 38 will generally open at 20° to 30° F. below the maximum heat attained during the previous cycle of warmth, so that placing the valve 38 in a relatively cool location allows it to open at a relatively low temperature. The valve 38 should be firmly secured at a location where it will be subjected to the normal bounces and vibrations, which, along with the rising temperature of the plastic body, help to free the ball as the car warms up after cold start. Thus, when the car is first started, after having been heated and completely cooled, the valve 38 is in a "stuck" condition, and there is no water flow. Flow starts when the engine 121 has warmed up.

The flow control valve 38 is actuated by pressure differences and has four basic functions:

(1) it serves as a check valve when the pressure difference is below a certain value, e.g., when a suction force is withdrawn, (2) it serves as a flow control valve when there is a significant pressure difference, e.g., when suction is applied to the valve's outlet end to draw fluid in from an inlet and send it out through its outlet, (3) it has what may be called a "top-end flow control mechanism" to regulate the flow in an additional manner when the input-output pressure differential is high, either to reduce the flow with increasing pressure differential after a certain pressure differential is reached to hold the flow at a certain rate or let it increase at a slow rate after that certain pressure differential is reached.

(4) it serves as a thermal shut-off valve, when used with an internal combustion engine.

All this is explained in co-pending patent application Ser. No. 348,700, filed Feb. 16, 1982.

In addition, there are two other important features of the valve 38.

One of them is to match the system to the type, end use, and displacement volume of the engine. This is done before installation of the valve 38. The mechanic blows into the inlet side of the valve 38 (preferably with the magnet holder 270 temporarily removed), while the tube 39 is attached to it, and the tube's outlet is placed into a container of water. This will result in air bubbles. While holding the body 255, the member 280 is slowly turned clockwise so that its end wall 285 first engages the ball 261 and then begins moving the ball 261 toward its seat 268. This is done very slowly, one click at a time, until the bubbles stop, showing that the ball 261 is against its seat 268, and he stops turning and blowing. Then, according to instructions furnished with the valve 38, the member 280 is slowly turned counterclockwise a number of clicks (audible and felt) which the instructions give as proper for the cubic inch displacement end use and type of the particular engine on which the system is being installed. Once that adjustment is completed, the mechanic installs the magnet holder 170 with its magnet 260 close to the ball and connects the tube 35 to the inlet fitting 277.

The other important feature is that of adapting the system to the relative heights of the reservoir 37 or 120 and the reactor 30, after both of those members have been installed and the reservoir 37 or 120 supplied with water or other aqueous liquid. The valve 38 has already been adjusted to the engine displacement volume and connected to the tubes 35 and 39. The inlet end of the conduit 35, with its weighted filter 36, is inserted into the reservoir 37 or 120 and the filter 36 goes to the bottom. Suction is applied to the free end of the conduit 39, which has not yet been connected to the reactor 30, and the tubes 35 and 39 and the valve 38 are thereby filled with water from the reservoir 37 or 120. The suction force is then withdrawn, and the valve 38 holds the water in the tubes 35 and 39.

The tube 39 is then temporarily suspended with its free end eight inches below the reactor 30, and the magnet holder 270 is slowly turned to retract the magnet 260 away from the ball 261 until the first drop of water falls from the free end. Then the tube 39 is pinched and then its end is attached to the fitting 70. The system has been adjusted to match the height of the reactor 30 relative to the height of the reservoir 37 or 120.

The water or other liquid may be supplied by the intake filter 36 seated in the water reservoir 37 of FIG. 1 and connected to the valve 38 by the conduit 35, all as shown in FIG. 1. This valve 38 may be any of those disclosed and claimed in my co-pending patent application, Ser. No. 348,700 filed Feb. 16, 1982, which is incorporated by reference herein. The water reservoir 37 may be a plastic bag-like member which is installed parallel to the axis of the vehicle in which the engine is placed; therefore it has an end closer to the front end of the vehicle and another end closer to the rear end of the vehicle. The filter 36 is simply a tubular member with a screen at one wide end 36a and its other, narrower end 36b connected to the conduit 35. Preferably, the filter 36 is located close to the rear end of the reservoir 37 so that upon sudden acceleration of the vehicle, there is an extra force sending water into the conduit 35 and on to the engine, giving a needed sudden pulse of liquid at a time when it is needed. To prevent faulty installation, the conduit 35 may be larger in diameter than the conduit 39 leading to the fitting 70 of the reactor 30.

The reservoir 120 of FIG. 15, used on V-8 and V-6 engines is round, i.e., annular, and sits atop the air cleaner 122. The intake member 36 is installed in the reservoir 120 towards the rear of the car, as in the rectangular reservoir 37.

Thus, it is seen that the reactor 30 takes in exhaust gas from the exhaust manifold 24 in accordance with the suction or pressure differential originating at the intake manifold 21 and which is connected through the control device 33 and the tube 32 to the outlet 59 from the reactor 30. The differential pressure and the scoop 55 cause the exhaust gas to flow, in accordance with this pressure differential, into the reactor 30. The first ejector opening 62 causes the drawing in of air from the air-intake space 45 via the passage 76, while the second ejectors 65 and 66 are simultaneously taking in water from the valve 38 and sending it into that air-intake space 45, directed toward the passage 76. This water is then reacted in the reactor 30 with the air and the exhaust gas, and the mixture is then sent to the control device 33.

The control device 33 (FIGS. 8-14)

As shown in FIGS. 8-14, the control device 33 may be an assembly of two molded plastic member 80 (FIGS. 8-10) and 81 (FIGS. 11-13). The member 80 includes an axial inlet 82 connected by the tube 32 to the reactor 30 and also a tangential inlet 83 connected by the tube 27 to the PCV valve 26 or its replacement 110 (FIG. 7). The member 81 includes an axial outlet 84 connected by the short conduit 34 to the PCV gas inlet 23. From the axial inlet 82, a simple cylindrical passage 85 leads into a vortex chamber 86 (FIG. 14) formed by the two members 80 and 81 when they are assembled together and into which the tangential inlet 83 also leads by a narrowing passageway 87 (FIG. 10).

The first molded plastic member 80 has a circular annular rim 90 (FIG. 10) with a cylindrical external wall 91 and a cylindrical interior wall 92. The interior wall 92 leads to a substantially annular shelf 93, from which a substantially cylindrical interior wall 94 leads to a flat substantially annular interior end wall 95. The axial inlet passage 85 opens into the center of the end wall 95. The tangential inlet passageway 87 leads through the shelf 93 and the substantially cylindrical wall 94 and on to the end wall 95. To aid in creating the vortex action, there is a substantially straight portion 96 of the wall 94 in line with the tangential side of the passageway 87, and opposite it the shelf 93 is amde to converge toward it between the walls 92 and 93 by a short angled portion 97 ending in a shorter parallel portion 98. The exterior of the member 80 is shaped to provide good anchorages for the conduits 27 and 32 and also to provide a generally efficient shape.

The second molded plastic member 81 has a circular annular end wall 100 with a cusp-like curved interior wall 101 leading to the central outlet 84 by an opening 102. When the members 80 and 81 are assembled, the walls 101 and 95 define the vortex chamber 86. A circular cylindrical stepped exterior wall 103 of the member 81 surrounds the end wall 100 and leads to an annular rim 104 therearound. From the central opening 102, the outlet 84 flares outwardly, preferably along a curved portion 105.

The first and second plastic members 80 and 81 fit together snugly and are, preferably, ultrasonically welded together with an annular end wall 100 facing the shelf 93 and the cylindrical exterior wall 103 nesting snugly in and welded to the interior wall 92. The rim 104 of the second member 81 faces, but need not touch, the rim 90 of the first member 80.

Thus, the mixture of exhaust gas, air, and water vapor passes from the reactor 30 into the vortex chamber 86 via the axial inlet 82, while the PCV gases are being drawn in through the tangential inlet 83 and are whirled around in a way to achieve maximum turbulence as a result of their tangential entry into and the shape of the vortex chamber 86. The resulting mixture is then very rapidly applied via the flaring outlet 84 to the intake manifold 21, just as in my patent 4,270,508.

While the PCV valve 26 may be used, it is preferably to remove the active parts of that valve. A simple way of accomplishing the same result is to substitute for the valve 26 a member 110 shown in FIG. 7, which exteriorly is shaped exactly like the PCV valve 26 and interiorly comprises a smooth cylindrical bore 111. This member 110 is then installed into the PCV valve passage 25. It may be an inexpensive plastic molded part made, for example, from polypropylene.

An alternative installation (FIG. 16)

FIG. 16 shows in a rather simplified manner the installation of the system on a diesel engine 20a. Here there is no throttle and (for illustrative purposes) no PCV system. There is an inlet opening 23 into the intake manifold 21. There may be no PCV valve and no PCV gas; in that event the inlet opening 82 is open to the atmosphere and takes in air. This can be done also with a gasoline engine if desired.

Also, FIG. 16 shows that a conduit 35a may be provided with a pair of ends 135 and 136 for connection to two valves 38 and 38a, which may be identical. These valves 38 and 38a are thus in parallel, and are connected to branched ends 138 and 139 of the conduit 39a. This parallel mounting of two or more valves 38 and 38a enables their use with very large engines 20a, rather than having to make a different size of valve.

To those skilled in the art to which this invention relates, many chnges in construction and widely differing embodiments of the invention will suggest themselves without departing from the spirit and scope of the invention. The disclosures and the description herein are purely illustrative and are not intended to be in any sense limiting.

I claim:

1. A combustion control system for an engine having an intake manifold, a gas inlet opening into said intake manifold, and an exhaust conduit, including in combination:
    a vortex device having a vortex chamber with a tangential inlet connected to a gas supply at substantially atmospheric pressure, a second inlet, and an axial outlet connected directly to said gas inlet opening of said intake manifold,
    a reactor device having a gas inlet connected directly to said exhaust conduit for drawing gas therefrom and an outlet spaced well apart from said vortex device and connected to said second inlet of said vortex device by a conduit, said reactor device comprising
    first ejector means for drawing in atmospheric air and mixing it with gas from said exhaust conduit, and
    second ejector means for drawing in liquid from a source of liquid and sending it into the atmospheric air drawn in by said first ejector means.

2. The system of claim 1 wherein said first ejector means comprises an air intake and said second ejector means includes an outlet separated from said air intake by an open space and means for sending its said exhaust gas and said liquid across said open space to said air intake for said first ejector means, thereby decoupling the intake of liquid from the pressure in the intake manifold.

3. The system of claim 2 wherein said first ejector means draws in its air from said open space.

4. The system of claim 1 having scoop means joining said engine exhaust to said reactor device for sending into said reactor device inlet the total exhaust pressure resulting from both the static head and the velocity head.

5. The system of claim 1 wherein said gas at atmospheric pressure is PCV gas.

6. The system of claim 5 wherein said PCV gas is in a conduit and has a valveless intake open at all times directly to the source of PCV gas in said engine.

7. The system of claim 1 wherein said gas at atmospheric pressure is air.

8. A combustion control system for an engine having an intake manifold with a throttle, a PCV gas inlet opening into said intake manifold, an exhaust conduit, and a PCV gas conduit, including in combination:
a vortex device having a vortex chamber with a tangential inlet connected to said PCV gas conduit, an axial inlet, and an axial outlet connected directly to said PCV gas inlet opening of said intake manifold,
a source of liquid spaced away from said vortex device,
valve means connected to said source for responding to pressure differential above a threshold value to deliver liquid through a liquid conduit attached thereto,
a reactor device spaced away from said vortex device and from said source of liquid having a gas inlet connected directly to said exhaust conduit for drawing gas therefrom and an outlet spaced well apart from said vortex device and connected to said axial inlet of said vortex device by a conduit, said reactor device comprising
first ejector means for drawing in atmospheric air and mixing it with gas from said exhaust conduit, and
second ejector means connected to said liquid conduit for drawing in liquid from said conduit according to the pressure differential established by said second ejector means for sending it into the atmospheric air drawn in by said first ejector means.

9. The system of claim 8 wherein said second ejector means includes means for sending the exhaust gas and liquid passing through said second ejector means across an open space to an air intake for said ejector means, thereby decoupling the intake of liquid from the pressure in the intake manifold, said first ejector means drawing in its air from said open space.

10. The system of claim 8 having at its gas inlet scoop means perpendicular to the flow of exhaust gas in said engine exhaust for sending into said reactor device the total exhaust pressure resulting from both the static head and the velocity head.

11. The system of claim 8 wherein said valve means comprises check valve means for preventing backflow from said liquid conduit to said source when said pressure differential drops below said threshold value and flow control means for regulating liquid flow relative to pressure differential above said threshold value.

12. The system of claim 11 wherein said source is a reservoir adjacent to said engine having a liquid conduit with one end in said reservoir and its other end connected to an inlet side of said valve, said one end having filter means, and said valve being outside said reservoir.

13. The system of claim 12 wherein said valve is located in free space spaced from said engine, the engine cooling system, and said reactor.

14. The system of claim 8 wherein said second ejector means comprises two separate ejectors of different diameter, said first ejector means comprising an ejector larger in cross sectional area than the second of said separate ejectors.

15. A reactor system for use in a combustion control system for an engine having an intake manifold and an exhaust, said reactor system including in combination:
a liquid reservoir,
a first conduit having a screened inlet,
a valve in said liquid conduit, one of which is near the bottom of said reservoir, and an outlet,
a reactor device having an intake conduit with an inlet for exhaust gas and an outlet conduit axially in line with said intake conduit for connection to said intake manifold,
an ejector assembly in said reactor axially in line with and in between said intake and outlet conduits and comprising
a first ejector directly interposed between said intake and outlet conduits, and
a second ejector leading from said intake conduit across an open air-intake space to an air intake opening just beyond said first ejector and having liquid intake means perpendicular to said second ejector, connected to the outlet of said liquid conduit, and leading into said second ejector ahead of said open air intake space.

16. The system of claim 15 wherein said engine is in a vehicle, the reservoir is positioned lengthwise of said vehicle with a rear end closer to the rear of the vehicle and a forward end, closer to the front of the vehicle, and said inlet to said liquid conduit is located near the rear end of the reservoir.

17. The system of claim 15 wherein said valve operates as a check valve until the differential pressure between atmosphere and the reactor liquid intake pressure reaches a threshold value and as a flow control valve thereafter.

18. The system of claim 17 wherein said valve incorporates a ferromagnetic valve in a non-ferromagnetic tube having a wall portion tapered to provide a first valve seat, a magnet in said tube attracting said valve toward said first seat while normal flow of said liquid forces said valve away from said first seat, and a seat member in said tube on the opposite side of said valve from said first seat and having a second seat spaced away from said first seat by a distance greater than the diameter of said ball.

19. The system of claim 18 having magnet holding means holding said magnet and adjustably mounted in said tube for varying the position of said magnet relative to said first seat.

20. The system of claim 18 or 19 wherein said seat member has means for adjusting its position in said tube relative to said first seat.

21. The system of claim 18 wherein said tube and said ball have different heat coefficients of expansion, such that on heating the first seat expands more than does the ball.

22. The system of claim 15 having two said valves in parallel with each other in said liquid conduit.

23. The system of claim 15 wherein said liquid conduit comprises a first liquid conduit with said inlet and an outlet connected to an inlet to said valve and a second liquid conduit having an inlet connected to an outlet from said valve and having said outlet that is connected to said liquid intake means.

24. The system of claim 23 wherein said first liquid conduit is substantially larger in diameter than said second liquid conduit, with corresponding attachment fittings on said valve, thereby facilitating correct connections to said valve.

25. A reactor device for use in a combustion control system for an engine having an intake manifold and an exhaust, said reactor device including in combination:
an intake conduit having an inlet for direct connection to said exhaust,
an outlet axially in line with said intake conduit, for connection to said intake manifold, an ejector assembly axially in line with and in between said intake and outlet conduits and comprising a first ejector directly interposed between said intake and outlet conduits, a second ejector leading from said intake conduit across an open air-intake space to an air intake opening just beyond said first ejector and having liquid intake means perpendicular to said second ejector and leading thereinto ahead of said open air-intake space.

26. The device of claim 25 wherein said second ejector comprises a pair of parallel ejector passages.

27. The device of claim 26 wherein one of said parallel ejector passages is about twice the cross-sectional area of the other.

28. The device of either claim 25 or 26 wherein said first ejector has a cross-sectional area larger than the total cross-sectional area of the second ejector.

29. The device of claim 25 wherein said intake conduit comprises a scoop-shaped portion for projecting into the exhaust gas stream.

30. The reactor device of claim 25 wherein said device is made as an assembly of metal parts comprising a body with a hexagonal exterior and a hexagonal interior and having, between its ends, one wall cut away to provide said air intake space, said intake conduit comprising a cylindrical tube with an inlet at one end, exterior threads and a hexagonal head at the other end fitting into the hexagonal interior of said body, said outlet conduit comprising a tubular member with a hexagonal outer wall fitting snugly inside said body at the opposite end of said intake conduit and with a cylinder tubular portion projecting beyond said body, an ejector assembly fitting snugly inside said body between said outlet conduit and said intake conduit, having a first ejector member with an opening therethrough and a second ejector member having at least one other smaller opening therethrough, said second ejector member having a portion projecting out through said air-intake space and provided with a passage leading perpendicularly into each said second ejector opening, and a cylindrical fitting connected to said second ejector member's passage for conducting liquid thereto, said first ejector member providing separation between said first and second ejectors between the outlets thereof and passage means leading from said air intake space into said outlet conduit.

31. The reactor device of claim 30 having a hexagonal ring swaged to said body and holding said body to said hexagonal head of said inlet conduit.

32. The reactor device of claim 31 wherein said second ejector member has two ejector openings.

33. The reactor device of claim 31 wherein said outlet conduit has a frustoconical inlet and wherein said first ejector member has a frustoconical segment and portion mating with the lower part of said frustoconical inlet and at the passage means leading from the air intake space has an arcuate upper end and flat sides.

34. The reactor device of claim 31 wherein said intake conduit has at its inlet approximately half of its wall removed to provide a scoop.

35. A combustion control device having a vortex chamber, for an engine having an intake manifold, an inlet opening into said intake manifold, and an exhaust conduit, including in combination a first molded plastic member having a circular annular rim with cylindrical external and interior walls, said interior wall leading to a substantially annular shelf from which a substantially cylindrical interior wall leads to a flat substantially annular interior end wall, said first member also having a central axial inlet portion with round exterior walls and an inlet passage opening into the center of said end wall, said plastic member further having a tangential inlet portion with circular exterior walls and a straight passage leading through said shelf and said substantially cylindrical wall and onto said end wall, a second molded plastic member having a circular annular end wall with a curved interior wall leading to a central opening, there being a circular cylindrical exterior wall around said end wall leading to an annular rim therearound, said second member having a round outlet portion wherein the central opening leads to a flared outlet passage, said first and second plastic members fitting together and sealed together with said annular end wall of said second member facing said shelf of said first member, said cylindrical exterior wall nesting snugly in and secured to said interior wall of said first member, said rim of said second member facing said rim of said first member.

36. The device of claim 35 wherein said cylindrical exterior wall of said second member is ultrasonically welded to said interior wall of said first member.

* * * * *